United States Patent [19]

Funger et al.

[11] Patent Number: 5,662,994
[45] Date of Patent: Sep. 2, 1997

[54] MOLDED PART AND METHOD OF ITS PRODUCTION

[75] Inventors: Bernhard Funger, Krefeld; Heinz Grüber, Tönisvorst, both of Germany

[73] Assignee: Eduard Küsters Maschinenfabrik GmbH & Co. KG, Krefeld, Germany

[21] Appl. No.: 264,659

[22] Filed: Jun. 23, 1994

[51] Int. Cl.⁶ .................................................. D04H 11/00
[52] U.S. Cl. ............................................................ 442/413
[58] Field of Search ................................... 428/224, 262, 428/310, 26, 225, 226, 229, 235, 238, 245, 247, 270, 290, 293; 264/45.8, 257, 45.3, 321; 521/170

[56] References Cited

U.S. PATENT DOCUMENTS

| 4,241,131 | 12/1980 | Bailey ......................................... 428/262 |
| 4,382,108 | 5/1983 | Carroll et al. . |

FOREIGN PATENT DOCUMENTS

| 252546 | 6/1966 | Austria . |
| 2491821 | 4/1982 | France . |
| 61094 | 7/1968 | German Dem. Rep. . |
| 2457585 | of 0000 | Germany . |
| 2457848A1 | 6/1976 | Germany . |
| 2722774A1 | 11/1978 | Germany . |
| 39 16 331 | 10/1990 | Germany . |
| 4137744A1 | 5/1993 | Germany . |
| 42 36 909 | 5/1994 | Germany . |
| 60-185823 | 9/1985 | Japan . |
| 833919 | 5/1981 | U.S.S.R. . |
| 1247277 | 7/1986 | U.S.S.R. . |
| 93/24295 | 9/1993 | WIPO . |

OTHER PUBLICATIONS

Ref A. Abstract of EP 633109—A1 (enclosed).

*Primary Examiner*—Merrick Dixon
*Attorney, Agent, or Firm*—Kenyon & Kenyon

[57] ABSTRACT

Carpet material with at least a proportion of uncleaned used carpets is shredded to form a fiber-like wooly mass. The carpet material contains a thermoplastic binder with a low melting point, for example polypropylene, which can be derived from the used carpets or be added. On at least one side of the carpet material, a cover layer of wood chips is provided. The carpet material, together with the layers of the adhesive-coated wood chips which form the cover layers, is compressed to form the molded part or panel, at a temperature which lies above the plasticizing point of the thermoplastic binder, but below the plasticizing point of any other thermoplastic components of the carpet material.

20 Claims, 2 Drawing Sheets

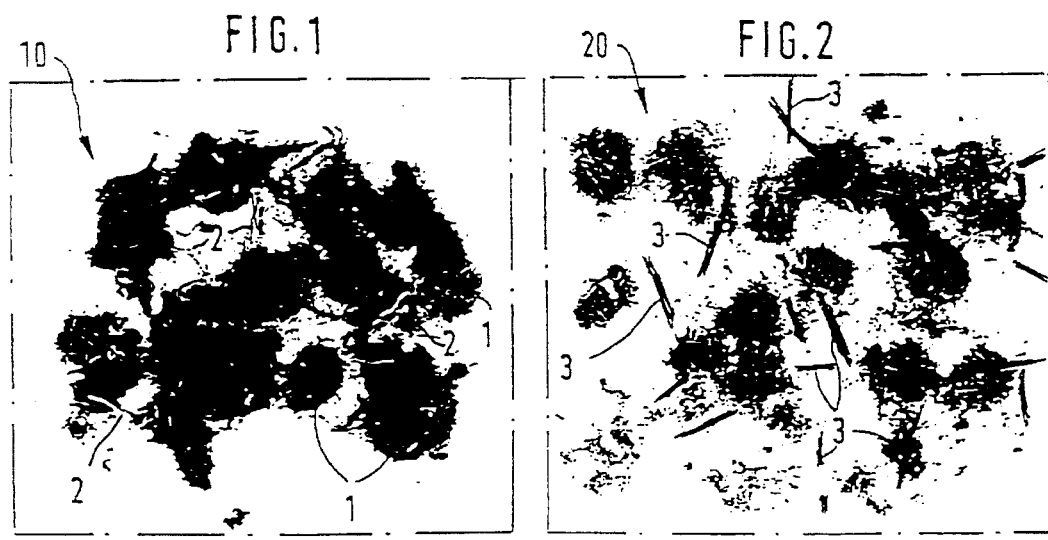
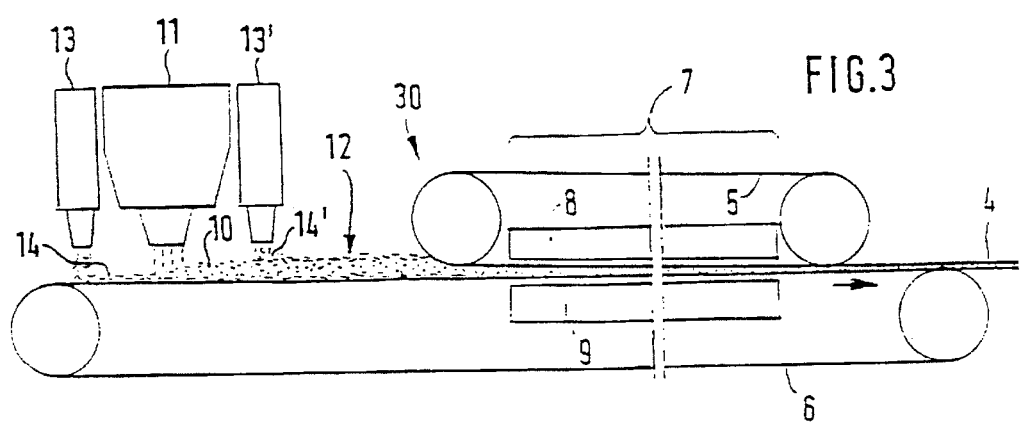

MOLDED PART AND METHOD OF ITS PRODUCTION

FIELD OF THE INVENTION

The present invention relates to the manufacture of molded parts, and more particularly to molded parts in which a component of the molded part is made from used carpets.

BACKGROUND OF THE INVENTION

The disposal of used carpets, i.e. carpets used in residences or commercial properties for many years and which are then removed and replaced with new carpeting due to wear or renovation, represents a problem of increasing significance. Until now, it has been typical to dispose of used carpets, which are considered special waste in many countries, including the Federal Republic of Germany, in either incinerators or garbage dumps.

However, many countries are considering laws which would make carpet manufacturers responsible for the disposal of used carpets, requiring the manufacturers to take back used carpets in a certain proportion to their current carpet production.

There are particular difficulties when considering possibilities for reusing the textile fiber material in used carpets, one being the fact that a mixture of different types of fiber materials is present in the used carpets which are collected, and another being that the textile fiber material is burdened with foreign substances.

There are two main reasons why different types of textile fiber materials are mixed in a collection of used carpets. One reason is that they can be mixed in the individual carpets themselves. For example, a carpet might have a pile of polyamide or polyester, with a backing of polypropylene. The other reason is that when used carpets are collected for recycling, they typically are bunched together and not sorted with regard to type of fibers. Therefore, all different types of fibers are present in the collection of used carpets. Moreover, the origin and the composition of each individual carpet piece is generally not known and too expensive to determine once the carpets are collected. The mixture of carpet types has another special aspect, since animal and plant fibers such as wool and cotton might also be present. In other words, in a collection of used carpets, practically everything must be expected with regard to fibers.

With regard to the foreign substances, studies have shown that the burden on the used carpets can be up to 30 percent by weight. This is dirt that has accumulated in the carpet over time, in the form of dust or mineral particles, and also residue from the backing, in other words the foam material and the fillers, as well as adhesive residues.

Efforts to recover the textile portion of the used carpets in a pure form are difficult. The used carpets must be cleaned and the foreign substances, with a proportion of up to 300 kg of these foreign substances per metric ton of used carpets, removed in some way. This labor-intensive process of cleaning and sorting the used carpet material is expensive and time-consuming.

There also have been many attempts to recycle new carpet material, as opposed to used carpet material, in a practical way, for example by compressing it into panels. This new carpet material is generally from waste strips left over from a carpet installation process, or production waste, and does not contain foreign substances. The exact fiber composition of the carpet to be recycled is also known to the manufacturer.

For example, a compressed molded element is described in DE 24 57 585 A1, which can also have the form of a panel, in which installation waste material from new carpets is shredded and allowed to set in the compressed state with a binder. The binder can contain phenolic resin, among other things, but can also be a foamable binder. The panel can have a cover layer of paper, textile material, plastic, wood or similar material. Another attempt of this type is the object of DE 27 22 774 A1, in which the use of installation waste from car carpets and needle-punched felts which contain thermoplastic components is described. The waste is shredded, arranged in a layer and heated above the melting point of part of the thermoplastic components, compressed and cooled. As an example for the thermoplastic components, polyethylene and polypropylene are named, both of which are already sufficiently capable of flow at 160° to 180° C. to penetrate the entire mass and form a homogeneous compressed element.

DD-PS 61 094 and AT-PS 25 25 46 also deal with the compression of installation or production waste to form panels.

What all the attempts mentioned above have in common is that they are aimed at the use of production and installation waste, in other words at unused material of the same composition, even if different types of fibers are mixed. These attempts did not approach or consider the problem of foreign substances, which may comprise up to 30 percent by weight of the used carpet and which influence the bonding of the panels and their mechanical properties.

DE 41 37 744 A1 describes processing used carpets by pressing and melting a panel of thermoplastic carpet components, especially in areas close to the surface, in order to form a type of carrier layer of a laminate material. However, it has been shown that the panels produced according to DE 41 37 744 A1 require further improvement in terms of their mechanical properties.

SUMMARY OF THE INVENTION

An object of the present invention is to allow for the permanent disposal of used carpets, with minimum effort.

Another object of the invention is to provide a strong and resilient molded part.

The invention therefore provides a molded part comprising: a used-carpet layer comprising finely shredded carpet fiber material, at least a portion coming from used carpets, and a thermoplastic binder, preferably in a proportion of 5 to 30 percent by weight of the used-carpet layer; and a cover layer comprising wood chips on at least one side of the used-carpet layer. The thin wood chips can be coated with an adhesive and also may be bound by a binder. The used-carpet layer in other words comprises: carpet fibers; fine-particle foreign substances comprising up to 30 percent by weight of the used-carpet layer; and a thermoplastic binder.

This results in a new type of wood material with an attractive exterior formed by wood chips. With a cover layer of such wood chips, the interaction with the plasticizable carpet material provided with the thermoplastic binder is of great importance. After spreading, the wood chip layer has a very non-uniform texture. It is pressed down by compression. Test results show that molded parts with a smooth, almost even surface can be produced, and that these can be used without further processing. The irregularities of the layer thickness which result from the random arrangement of the flat wood chips are pressed away towards the inside and are absorbed by the thermoplastic carpet material. Therefore, while the exterior surface is smooth, the interior surface of the chip layer which faces the compressed carpet material is irregular and undulating, but this can be equalized by the plasticized carpet material. This material is new in type and possesses very advantageous properties, and actually an innate decorative value, which permits its use without further refining. Despite the wood-like appearance of the molded parts according to the invention, their consumption of wood is low, because the inside consists not of wood but of the carpet material, which is reused in this way, without great additional effort and is permanently and safely disposed of.

The molded parts according to the invention—primarily but by no means exclusively panels—have an astonishing bending resistance, in other words the material has a high modulus of elasticity. For instance, using one's hands, it is almost impossible to bend a 6 mm thick, 20 cm square panel of the material according to the invention by an amount of more than the thickness. It cannot be broken by hand.

The interaction of several characteristics is important for the high bending resistance.

First of all, the carpet material has to be shredded so intensively that the shredded product does not resemble carpeting in any way. This shredding results in breaking the carpet material down into its individual fibers, so that the shredded product becomes a type of coarse wadding, which is what is meant by the term "fibrous wooly material."

If this shredded material is compressed with a thermoplastic binder which melts at the processing temperature, it is entirely penetrated by the thermoplastic binder, and the thermoplastic binder forms a type of matrix in which the fibers form embedded reinforcement elements, so that a type of laminate material results. Because of the fine shredding of the carpet material, the volume of the finished molded part is penetrated quite homogeneously by fibers, so that no large unreinforced zones occur, and the molded part appears homogeneously reinforced on the outside.

This forms the used-carpet layer, which contains the carpet material and is in itself already quite stable. This layer is now provided on at least one side, but normally on both sides, with a cover layer of adhesively bonded wood chips, which apply a high modulus of elasticity and a high tensile strength precisely at the locations that are particularly important for bending resistance, namely the outer layers. This results in a type of sandwich effect with significantly reinforced rigidity.

Another advantageous result in connection with the invention, which would not have been expected by one skilled in the art, consists of the fact that a high proportion of foreign substances in the used carpets is recycled. In other words the dirt, the foam residue and the adhesive residue is integrated into the molded parts without problems, and has a rather positive influence on the strength properties of the material. Using the method according to the invention, it is possible to process used carpets in the condition in which they were delivered, and to produce the molded parts according to the invention from them without complicated cleaning and separation processes.

The molded parts have a good surface quality and can frequently be used as they come from the press.

There are several reasons why the material in the press is not heated to such a point that all the thermoplastic components in the used-carpet layer melt: first, a proportion of fibers should maintain their fiber structure and intermesh in order to act as a reinforcing laminate material in the finished material. Second, the melting of all thermoplastic components requires high temperatures which are difficult to achieve with present heating liquids for presses. The high temperatures are also not desirable because of heat losses. Instead, it is desirable to heat the material just to the point where the lowest melting and plasticizing ranges of the thermoplastic binder are exceeded. This allows for development of the bonding mechanism via melting and distribution of these thermoplastic components throughout the entire used-carpet material layer under pressure.

The heat must be introduced into the compressed mass, which has poor heat conductivity, from the compressed surfaces of the mass, requiring a certain amount of time until the temperature in the interior has also increased to a value sufficient to melt the thermoplastic binder.

The arrangement of the wood chips in a random fiber direction, essentially parallel to the surface of the molded part, promotes the formation of a rather smooth surface layer without a preferential direction parallel to the surface.

The wood chips preferably are flat, thin wood chips.

In this connection, a decorative surface, particularly attractive for the construction industry, is obtained in cost-effective manner, because the effort to shred the flat wood chips of the cover layer (flakes) is less than for fiber-like wood chips.

A majority of the wood chips of the cover layer preferably have a thickness of 0.1 to 0.3 mm and an outline essentially in the shape of a rectangle, the length of which is 2 to 10 cm and the width of which is 2 to 30 mm. However, finer fiber-like wood chips can also be used, as with those used in medium density fiber (MDF) panels.

One thermoplastic binder which may be used in the used-carpet layer is polypropylene, which frequently occurs in modern wall-to-wall carpeting, for example as the backing material. It has a plasticizing point in the range of approximately 160° C. and achieves a relatively low viscosity, which promotes distribution through the fiber mass.

In cases where the carpet material available comprises sufficient thermoplastic binders on its own, the carpet material can be used in the state in which it is delivered.

If, however, the inherent content of thermoplastic binder with a low melting point in the carpet material is too low, such a binder can also be added to the carpet material, for example in the form of pure waste material consisting of the thermoplastic binder, for example carpet scraps from production or installation.

Although the problem of used carpets was the starting point of the invention, it is not limited to the exclusive use of such used carpets, rather only a certain proportion of such used carpets must be present. Other new carpet scraps or other small-particle scrap can also be added to them.

A duroplastically hardening binder can also be added to the used-carpet material layer, preferably in a percentage by weight of 1 to 15 percent of the used-carpet layer. Possible duroplastically hardening binders to be used as a binder for the wood chips of the cover layer are known from chip board technology, with the most important ones being urea formaldehyde resin, melamine formaldehyde resin, phenolic formaldehyde resin and isocyanate.

The properties of the invention described until now are independent of the shape of the molded part. This means that corresponding compression molds can be used in the production of the material by compression, resulting in paneling and acoustical elements and similar items.

However, a significant embodiment of the invention is a molded part in the form of a panel, which can be pressed in a heated double-band press, for example.

The starting material used to produce the molded part according to the invention or the panel, made from shredded carpet scraps, is not without problems in terms of its structure. It consists of the textile fibers which form the fibrous (fiber-like) wooly material that has been mentioned, and the foreign substances present in the used carpets, which contain a certain proportion of mineral dirt substances. These substances have a tendency to fall down through the wooly material, so that an uneven composition of the molded part or the panel frequently occurs when the mat to be compressed is spread out, because the foreign substances collect on the bottom layer.

In order to avoid this effect, it has proven to be practical if the molded part contains wax or stearin, preferably in a proportion of 0.5 to 2% by weight of the used-carpet layer, which has been added to the carpet material to be compressed before it is spread, for example by spraying it on as an emulsion or in another liquefied form. Mixing with the wax or stearin can take place during shredding of the carpet material, for example during grinding, or in a separate mixing process which follows shredding. Surprisingly, it has been shown that an addition of wax or stearin results in a significant reduction in demixing of the foreign substance components and the fiber components of the total material to be compressed, so that the undesirable uneven composition of the molded parts or panels can be almost completely suppressed.

The method of making the substance includes forming a mat of finely shredding a used carpet material, can include adding thermoplastic binder to the used carpet material, and includes adding a layer of adhesive-coated wood chips oriented parallel to the used carpet surface either before or after spreading of the mat or both. The shredded carpet material preferably includes the presence of a thermoplastic binder in a proportion of 5 to 30 percent by weight of the carpet material layer to be compressed. The wood chips and used carpet material are then compressed at a temperature which lies above the melting point of the thermoplastic binder, but below the melting point of any other thermoplastic components contained in the total mass, to form a compact structure.

The used-carpet material can first be chopped into pieces with the largest dimensions in the range of 5 to 15 cm, and then subsequently ground or torn. The grinding can also be accompanied by a sieve, in which the material is ground until the carpet material passes through the sieve, which can have a selected fineness.

An additive of wax or stearin can also be added before the used-carpet material is compressed, preferably in a proportion of 0.5 to 2 percent of the weight of the total carpet-layer mass to be compressed. The wax or stearin can be added during the grinding process.

The total mass can also be spread out and then have a substance added to one side before processing, so that a varying composition profile over the thickness of the compressed mass results.

A variety of different substances, as discussed above, can be added to the used-carpet mass to be compressed, or can be layered together with the used-carpet mass.

BRIEF DESCRIPTION OF THE DRAWINGS

The invention will be explained in greater detail using the following figures.

FIG. 1 shows a view of the carpet material to be compressed according to the invention, on a scale of approximately 1:1;

FIG. 2 shows a view of an embodiment of a cover layer material consisting of adhesive-coated, long fiber-like wood chips, on a scale of approximately 1:1;

FIG. 3 shows a schematic side view of a double-band press for the production of panel material according to the invention;

DETAILED DESCRIPTION

Figure 4:
FIG. 4 shows a view of a panel material according to the invention with a different cover layer material of flat, thin wood chips.

The carpet material reproduced in FIG. 1 comprises used carpets which have been chopped in a chopper, into pieces with a size of approximately the palm of a hand, and subsequently have been finely ground in a mill, with no kind of cleaning taking place and with the burden of foreign substances, particularly dirt, sand and other mineral particles, which amounts to as much as 30% of the weight, remaining in the material.

Shredding by means of grinding goes so far that the carpet structure is entirely lost and only a fibrous wooly material remains, which agglomerates to form small, loose wads 1 when it passes through the exit sieve of the mill. In the embodiment shown, the carpet had a polyamide pile and a strip backing of polypropylene. The backing particles 2 are still recognizable as a different material. The thermoplastic components make up about 5 to 30 percent by weight of the ground used carpets, about 20 percent by weight in the embodiment shown. It should be noted that so long as the used-carpet component makes up a major portion of the used-carpet layer, it is often sufficient to estimate the thermoplastic binder component portion present in the used-carpet as that of the entire molded part. Therefore, a thermoplastic binder component of 5 to 30 percent by weight of the used-carpet to be processed, as opposed to the total weight of the used-carpet layer, is also possible.

The carpet material 10 contains sufficient polypropylene, in itself, which serves as a thermoplastic binder. If this is not the case, then additional polypropylene or a comparable thermoplastic binder has to be added.

FIG. 2 shows a first wood material 20, which is possible for use as a cover layer. This involves fiber-like, i.e. thin, flexible wood chips 3, which are long in comparison with their cross-section, which demonstrate a size distribution with a thickness maximum of approximately 0.2 to 0.4 mm and a coefficient of fineness of approximately 1:10 to 1:100. The "thickness" should be understood to mean the smallest dimension of the cross-section. The wood chips 3 are obtained by grinding. In FIG. 2 they are spread out loosely. In fact, they are spread more densely, so that the wood fibers 3 in themselves form practically a sealed layer, which becomes a compact, wood-like cover layer under the influence of pressure and heat, when the binder hardens.

The binder is phenolic resin, for example, or a similar resin-like, duroplastically hardening binder, as is known from chip board production and which is added to the wood chips 3 using known techniques.

The starting material is compressed in the double-band press 30 of FIG. 3 to form a panel web 4. The double-band press 30 comprises an upper die band 5 and a lower die band 6 made of sheet steel, which bands run continuously over deflection rollers and advance in the direction of the arrow, at the same speed, facing each other, in a compression segment 7. In the region of the compression segment 7, the advancing die bands 5, 6 are supported by means of corresponding devices 8, 9, which are only indicated schematically, and heat can be transferred through the die bands 5, 6 onto the panel web 4 which forms.

The bottom die band 6 is preceded by a spreading segment 12, in which a mat or bulk mass 12 is produced from supply containers 13, 11, 13' by means of suitable spreading devices. The bulk mass 12 comprises a bottom layer 14 from the supply container 13, which results in the bottom cover layer, a layer of the carpet material 10 which contains the thermoplastic binder from the supply container 11, and an upper layer 14' from the supply container 13', which results in the top cover layer. The wood chips in the layers 14, 14' are adhesive-coated. They can consist of the wood material 20 of FIG. 2, for example, with the fiber-like wood chips 3, or of the larger, flat wood chips 18, which will be described below in connection with FIG. 4 and 5.

The bulk mass 12 is compacted as it enters between the die bands 5, 6 and hardened in the compression segment 7, according to a predetermined time-temperature-pressure diagram. The finished, hardened panel web is cooled in the last section of the double-band press or in a separate subsequent cooling device, and can then be cut to size. A panel 14 taken from the panel web 4 has a dense, rather smooth, wood-like surface, the structure of which depends on the wood material used for the cover layers.

With the wood material 20, the surface is almost free of any bumps or structure, as is known from MDF panels, for example. In the present embodiment, as homogeneous as possible a distribution of the components was the goal.

Figure 5:
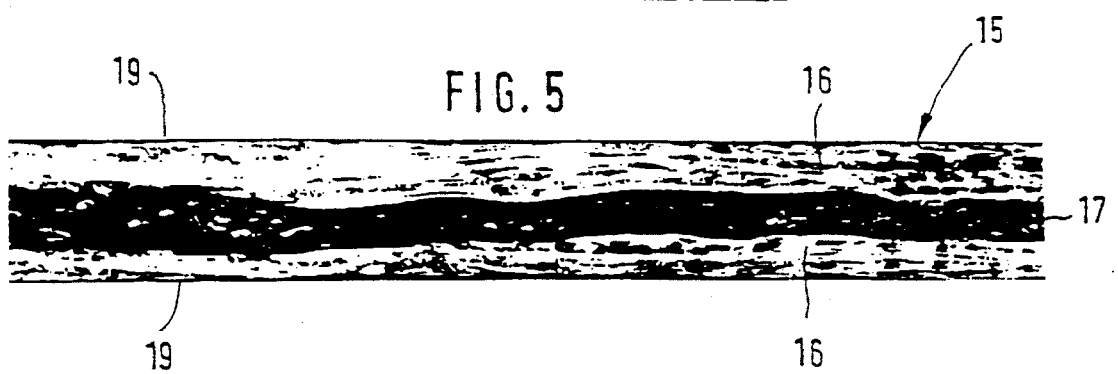
FIG. 5 shows a cross-section of the panel according to FIG. 4 in approximately 1.5 times enlargement.

In FIG. 4 and 5, however, a panel is reproduced which has a cover layer 16 of large, flat and very thin wood chips with a thickness of approximately 0.2 mm and an essentially rectangular outline on both sides. For production of the panel 15, the bottom layer is first spread with adhesive-coated chips 18, then the center layer 17 consisting of the shredded carpet material according to the invention with two binders on that and applying the top cover layer 16 consisting of the adhesive-coated thin chips 18 on top of that. The whole thing is passed through the double-band press 30. The tangled distribution of the chips 18 results in random differences in the local accumulation of wood material, therefore resulting in different layer thicknesses of the cover layers 16 at a certain compression pressure. Since the middle layer 17 of the carpet material according to the invention, which contains thermoplastic binder, demonstrates strong thermoplastic properties when pressure and heat are applied in the compression segment 7, the thickness profile of the layers 16 is pressed into the inside, as is evident in FIG. 5, while the outer surfaces 19 remain practically even. A laminate material that is very resistant to bending is obtained, with the interesting surface evident from FIG. 4. This surface is even and flat in spite of the random distribution and demonstrates only slight steps on the magnitude of the predominant chip thickness, in other words with a height of 0.1 to 0.3 mm, if any, at the edges of the uppermost chips 18.

For the production of the panel web 14 according to FIG. 3, a double-band press according to DE-PS 21 57 764 was used. The temperature of the die bands 5, 6 according to FIG. 3 was approximately 200° C., the pressure in the compression segment 7 was approximately 500 N/mm². The time during which the carpet material was subject to this temperature and this pressure was 90–180 seconds.

While the present invention has been detailed in the embodiments described above, it is contemplated the invention may encompass further embodiments than those described.

What is claimed is:

1. A compressed part comprising:
   a used-carpet layer comprising finely shredded carpet fiber material, at least a portion coming from uncleaned used carpets, and a thermoplastic binder in a proportion of 5 to 30 percent by weight of the used-carpet layer; and
   a cover layer on at least one side of the used-carpet material, the cover layer comprising wood chips.

2. The compressed part as recited in claim 1 wherein the wood chips are arranged randomly within the cover layer.

3. The compressed part as recited in claim 1 wherein the cover layer comprises flat thin wood chips.

4. The compressed part as recited in claim 1 wherein the wood chips predominantly have a thickness of 0.1 to 0.3 mm and an outline essentially in the shape of a rectangle, the length of which is 2 to 10 cm and the width of which is 2 to 30 mm.

5. The compressed part as recited in claim 1 wherein the wood chips are fiber-like.

6. The compressed part as recited in claim 1 wherein the wood chips have a fiber-like structure and a size distribution with a maximum thickness of 0.2 to 0.4 mm and a coefficient of fineness of 1:10 to 1:100.

7. The compressed part as recited in claim 1 wherein the thermoplastic binder is polypropylene.

8. The compressed part as recited in claim 1 wherein the cover layer further comprises a duroplastically hardening binder.

9. The compressed part as recited in claim 8 wherein the duroplastically hardening binder is urea formaldehyde resin, melamine formaldehyde resin, phenolic formaldehyde resin or isocyanate.

10. The compressed part as recited in claim 1 wherein the used-carpet layer comprises a proportion of 0.5 to 2 percent by weight wax.

11. The compressed part as recited in claim 1 wherein the used-carpet layer further comprises a proportion of 0.5 to 2 percent by weight stearin.

12. The compressed part as recited in claim 1 wherein the wood chips are long in comparison with their cross-section.

13. The compressed part as recited in claim 1 wherein the cover layer has an outer surface, the outer surface being smooth.

14. A compressed part comprising:
   a used-carpet layer comprising finely shredded wooly carpet fiber material, at least a portion coming from uncleaned used carpets, and a thermoplastic binder in a proportion of 5 to 30 percent by weight of the used-carpet layer; and
   a cover layer on at least one side of the used-carpet material, the cover layer comprising wood chips.

15. The compressed part as recited in claim 14 wherein the wood chips are long in comparison with their cross-section.

16. The compressed part as recited in claim 14 wherein the cover layer has an outer surface, the outer surface being smooth.

17. The compressed part as recited in claim 14 wherein the wood chips are arranged randomly within the cover layer.

18. The compressed part as recited in claim 14 wherein the cover layer comprises flat, thin wood chips.

19. The compressed part as recited in claim 14 wherein the thermoplastic binder is polypropylene.

20. The compressed part as recited in claim 14 wherein the cover layer further comprises a duroplastically hardening binder.

* * * * *